Figures 1, 2:
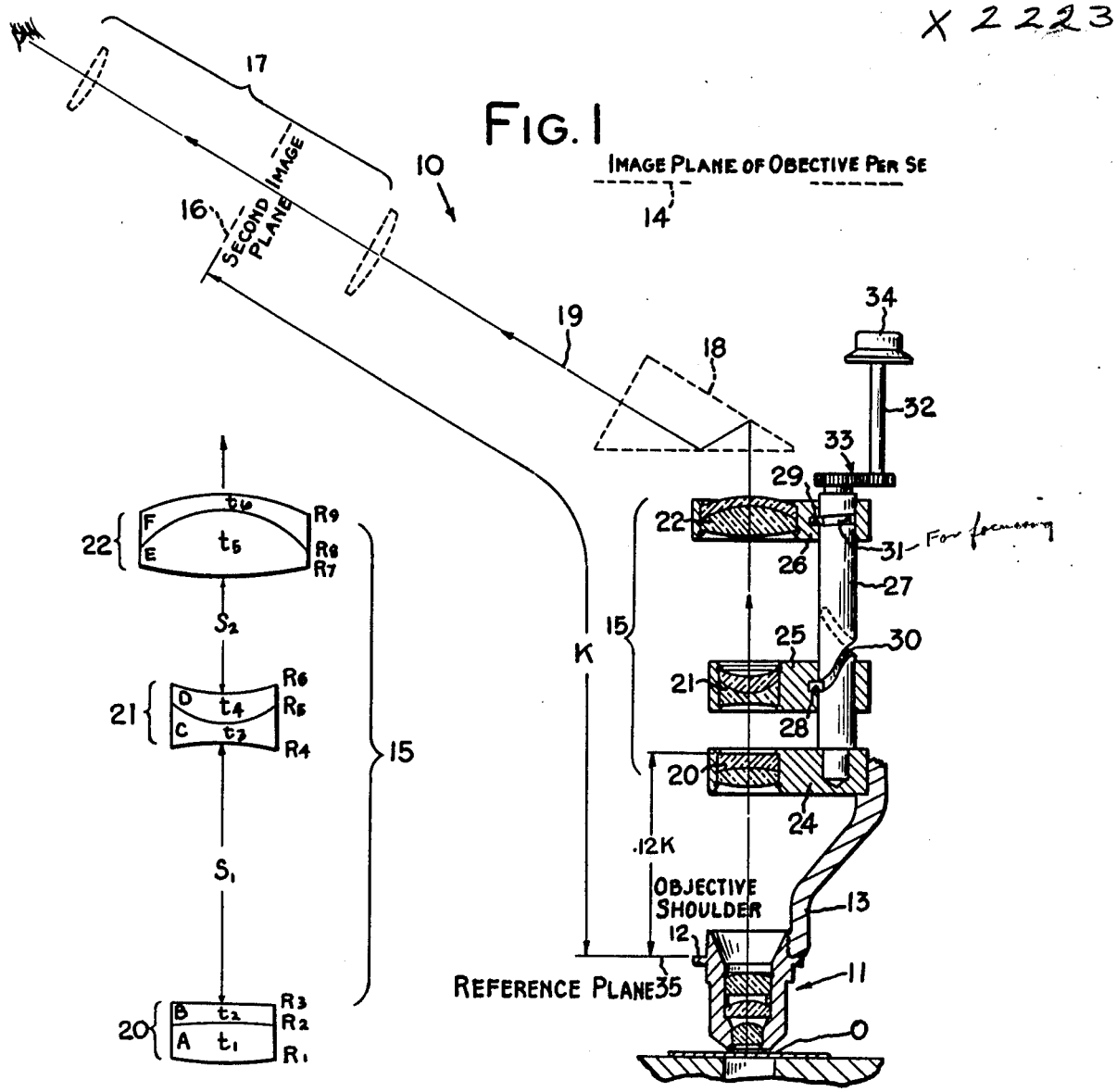

April 24, 1962    D. C. MORTIMER ET AL    3,030,861
VARIABLE POWER OPTICAL SYSTEM FOR MICROSCOPES
Filed June 29, 1959    2 Sheets-Sheet 1

INVENTORS
DONALD C. MORTIMER
RICHARD L. SEIDENBERG
BY Frank C. Parker
ATTORNEY

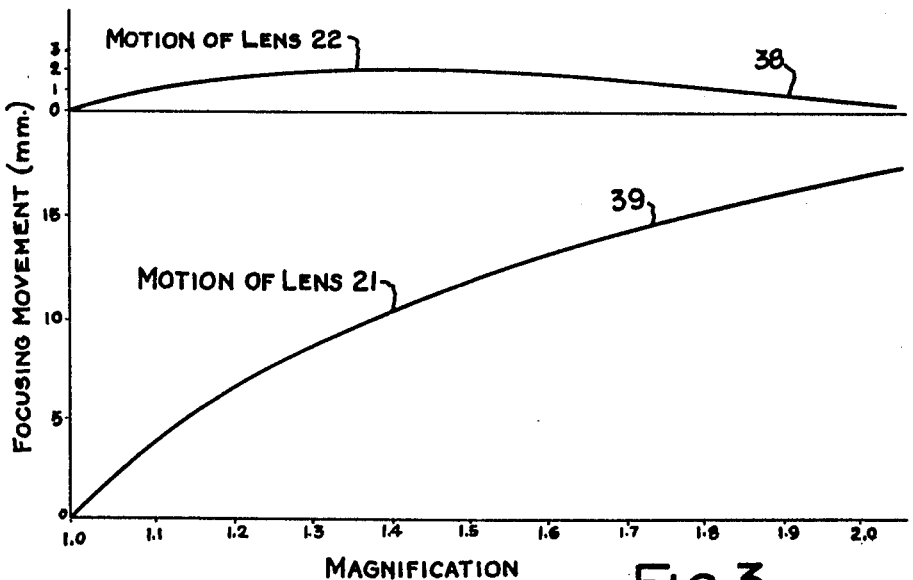
FIG.3
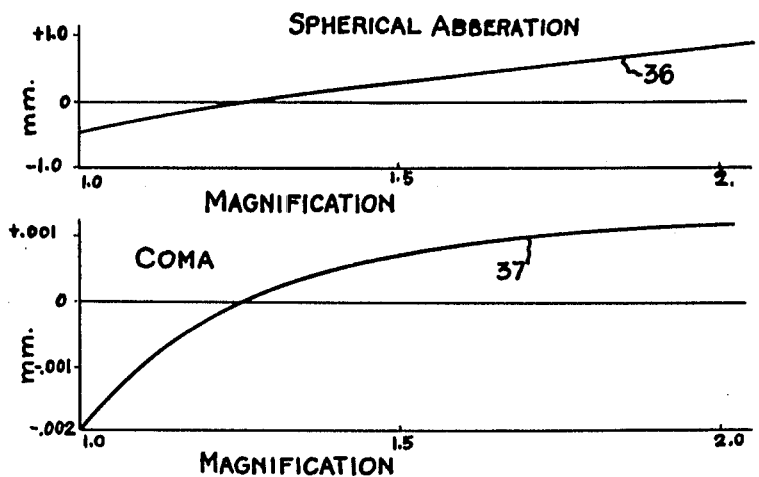
FIG. 4
FIG.5
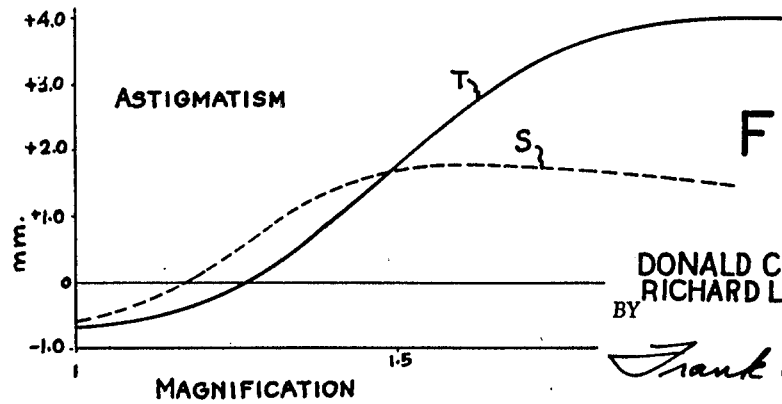
FIG.6

3,030,861
VARIABLE POWER OPTICAL SYSTEM FOR MICROSCOPES

Donald C. Mortimer and Richard L. Seidenberg, Rochester, N.Y., assignors to Bausch & Lomb Incorporated, a corporation of New York
Filed June 29, 1959, Ser. No. 823,719
1 Claim. (Cl. 88—57)

The present invention relates to an optical system for microscopes and the like and it relates more particularly to variable power or "zoom" lens means which form a part of said system and provide a continuously variable magnification of the image formed thereby.

In the prior microscope art, variable power optical systems have been disclosed wherein the change in image size is secured in several steps. The difficulty with step magnification in a microscope is that an infinite number of intermediate magnifications of the object are not available and consequently the microscopist's examination is conducted with such jumps in magnification that identification of minute detail in the transition from one magnification to the other is sometimes difficult and may actually be lost for a time.

It is an object of this invention to provide an optical system for a microscope having variable power lens means of the "zoom" type integrated therewith whereby the size of the image of the object, which is under examination, may be continuously and progressively varied through a range of magnifications.

Another object is to provide such an optical system having embodied therein variable power lens means which provide sufficient overcorrected Petzval curvature to counteract the undercorrected Petzval curvature of the other parts of the optical system, said means further being particularly corrected for coma, astigmatism, and spherical aberration.

It is a further object to provide such a device in well integrated form, the variable power means being adaptable to many kinds of microscopes, while being easy to operate and capable of precision performance.

Further objects and advantages will be apparent in the arrangement, construction and combination of the component parts of said optical system by reference to the specification herebelow taken in connection with the accompanying drawings wherein, FIG. 1 is a side view of a microscope optical system embodying one form of our invention, parts thereof being shown schematically and sectionally, FIG. 2 is an axial section showing the optical parts of the variable power lens means in axial section and in high power position, FIG. 3 is a graphical representation of the absolute movements of the movable parts of the optical system according to a preferred form of our invention, FIG. 4 is a graphical representation of the spherical aberration in said preferred form of the optical system, FIG. 5 is a graphical representation of coma in the preferred form of optical system and, FIG. 6 is a graphical representation of astigmatism in said preferred form of optical system.

In FIG. 1 of the drawings is shown an optical system for a microscope indicated generally at 10 and comprising an objective 11 having a locating shoulder 12 which is adapted to seat against the lower end of a microscope housing member 13, said member being mounted in the usual manner in a microscope frame, not shown. The objective 11 per se forms rearwardly a first image 14 of the specimen or object "O" under examination. Vertically aligned between the objective 11 and the first image 14, variable power relay lens means 15 are provided which cooperate with the objective to form a second image 16 rearwardly thereof. The second image 16 is viewed by a suitable eyepiece 17 which is focused on said image. An inclination prism 18 is provided close above the relay lens means 15 wherein the line of sight or optical axis 19 is obliquely directed so as to bring the eyepiece 17 down to a comfortable viewing position.

According to this invention, the aforesaid variable power relay lens means 15 are in the form of a "zoom" type lens which provides a continuous and uninterrupted variation in the power or image magnification of the optical system 10 so that the final image may be continuously changed in size throughout a range of magnifications. As shown in FIGS. 1 and 2 of the drawings, said lens means 15 comprises a stationary front lens 20 of positive power, a movable intermediate lens 21 of negative power and a movable rear lens 22 of positive power, all aligned on the optical axis 19. The front side of the optical system 10 is assumed to be toward the object "O."

With reference to FIG. 1, means are provided for supporting lenses 20, 21 and 22 comprising the individual cells 24, 25 and 26, respectively, which are mounted in spaced alignment with each other and with the other parts of the optical system 10 on an upright shaft 27 in any preferred manner such as that shown in the drawings. As here shown the lens cell 24 is fixedly held in the frame 13 in fixed relation to the objective 11 and the shaft 27 is rotatably mounted in cell 24 with each of the movable lens cells 25 and 26 being slidably fitted thereto.

Preferably, pin and slot mechanisms are provided for moving the movable lenses 21 and 22 relative to each other and relative to the stationary lens 20 with a differential non-linear movement according to a law such that the image 16 formed by the lens system 10 will remain substantially stationary for all magnifications of the image. For this purpose, pins 28 and 29 are inset into fitted recesses in the cells 25 and 26, respectively, and at the other end the pins engage with companion cam slots 30 and 31, respectively. The cam slots 30 and 31 are formed in longitudinally separated position in the shaft 27, said slots having appropriate spirals such that the aforesaid law for the relative motion of the lenses 21 and 22 is effected. For rotating the shaft 27, a rotatable actuating shaft 32 is preferably provided, said shaft being drivingly connected to shaft 27 by gearing means, indicated at 33. A knob 34 is fixed to the upper end of the actuating shaft 32 for manually rotating it.

One of the most important requirements in achieving a stationary image 16 for all different magnifications of the "zoom" lens system 15 is the selection of relative powers or focal lengths for the lens members 20, 21 and 22. By computation and experimentation, we have discovered that the stationary positive lens 20 should have a focal length lying between .70K and .86K, when "K" represents the axial distance between a reference plane 35 and the image 16, FIG. 1, which is cooperatively formed by the objective 11 and variable power lens means 15. The objective shoulder 12 is assumed in this case to be coplanar with the reference plane 35 and this is the element of the objective 11 which abuts against the microscope housing wherein it is supported. In the same way, the focal lengths of the negative movable lens 21 and the positive movable lens 22 should lie between —.09K and —.11K, and between .18K to .22K, respectively. The stationary positive lens 20 lies at a fixed distance of substantially .12K rearwardly of reference plane 35.

In one successful form of this invention, when the lens means 15 is producing unity magnification, the stationary positive lens 20, the movable negative lens 21, and the movable positive lens 22 are working respectively at +0.6 power, —0.7 power, and +2.36 power while the focal length of the lens means 15 for this magnification lies between 3.0 and 3.5 times the over-all axial length of said means, measured from the vertex of $R_1$ in FIG. 2 to the vertex of $R_9$. When this lens means 15 produces +1.5 power, the negative lens 21 works at —1.08 power and the movable positive lens 22 works at substantially +2.3 power and the lens means are also substantially afocal. At 2 power, this lens means has a focal length of between 3.65 and 4.0 times the aforesaid over-all axial length.

The imagery of most microscopes may be decidedly improved by the use of an optical system such as that here disclosed. This improvement is effected by overcorrecting the Petzval curvature, which is produced by the variable power lens means 15, sufficiently so that it substantially compensates the serious undercorrection of Petzval curvature found in most microscopes. For this purpose, the negative lens 21 may be given a negative power great enough to secure an improved balance between negative and positive powers of the lenses 21 and 22, respectively, so that an overcorrected Petzval curvature results.

Furthermore, the image quality and sharp focusing capability of the optical system 10 is greatly improved since the spherical aberration, coma and astigmastism properties of the "zoom" lens system 15 are well corrected over the entire field and throughout the entire range of magnifications. In FIGS. 4, 5 and 6 of the drawing are shown curves representing the excellent correction for spherical aberration, coma and astigmatism, respectively, the departure in millimeters from zero condition of each being plotted through the entire range of magnifications of the image 16. The spherical aberration curve is numbered 36 and the coma curve is numbered 37 while the tangential astigmatism curve in FIG. 6 is marked "T" and the sagittal astigmatism curve is marked "S." With reference to FIG. 3 of the drawings, curve 38 represents the absolute movement of the lens 22 and curve 39 represents the corresponding movement of the negative lens 21 throughout the entire magnification range.

A preferred form of variable power relay lens means 15 for microscopes is shown in detail in FIG. 2 and the constructional data therefor are given in the table herebelow. In this form of the invention, the stationary positive lens 20 is compound and is formed of a front biconvex element, represented by the letter "A," which is cemented to plano concave element "B." Likewise, the movable negative lens 21 is composed of a front biconcave element "C" which is cemented to a concavo-convex meniscus element "D" and the movable positive lens 22 is composed of a front biconvex element "E" which is cemented to a rear concavo-convex meniscus element "F."

FIG. 1 represents the lens members 20, 21 and 22 in the position occupied for producing unity power of the variable power lens means 15 and FIG. 2 shows the relative positions of said lens members when the lens means yields two power.

In the table given herebelow, the constructional data for making the aforesaid preferred form of variable power lens means is set forth, wherein $R_1$ to $R_9$ represent the refractive curvatures of the lens elements, numbering from front to rear, $t_1$ to $t_6$ represent the axial thicknesses of the lens elements, $S_1$ and $S_2$ represent the air spaces between the lenses 20, 21 and 21, 22, respectively, $n_D$ represents the refractive indices of the glasses in the lens element and $\nu$ represents the Abbe number or partial dispersions of said glasses,

[Zoom Range=2]

| Lens | Curvatures | Thickness | Spacing at Unity Magnification | $n_D$ | $\nu$ | Focal Length |
|---|---|---|---|---|---|---|
| A | $+63.98 = R_1$ | $t_1=3.9$ | | 1.498 | 67.0 | +190.0 |
| B | $-98.175=R_2$ | $t_2=2.0$ | | 1.751 | 27.8 | |
| | Plano $= R_3$ | | $S_1=10.3$ | | | |
| | $-40.551=R_4$ | | | | | |
| C | $+8.472=R_5$ | $t_3=1.8$ | | 1.573 | 57.4 | -23.50 |
| D | $+15.75 = R_6$ | $t_4=3.2$ | | 1.720 | 29.3 | |
| | $+67.92 = R_7$ | | $S_2=26.8$ | | | |
| E | $-17.80 = R_8$ | $t_5=6.9$ | | 1.573 | 57.4 | +49.38 |
| F | $-35.00 = R_9$ | $t_6=1.2$ | | 1.720 | 29.3 | |

A variable power relay lens, constructed according to the above disclosed data, may be integrated into the optical systems of many kinds of microscopes having various uses, by placing said relay lens between the objective and the image which it forms by itself of an object. The disclosed variable power lens means is capable of precision performance and excellent imagery over the entire range of image magnification, all in fulfillment of the objects of this invention.

Although only one form of this invention has been shown and described in detail, other forms and arrangements are possible within the combination described and within the scope of the claim appended hereto.

We claim:

An optical system for microscopes and the like comprising a continuously variable power lens means embodying a stationary lens of positive power, a movable lens of positive power spaced rearwardly therefrom, and a movable lens of negative power optically aligned and spaced between the two last-mentioned lenses, the movable lenses being movable with reference to the stationary lens and to each other in a differential non-linear manner to vary the power of said system continuously according to a law such that the image produced by said system is maintained substantially stationary for all magnifications thereof, said lens means being constructed according to the data given in the table herebelow wherein $R_1$ to $R_9$ designate the refractive curvatures of the respective lenses numbering from front to rear of the system, $t_1$ to $t_6$ designate the respective lens thicknesses, $S_1$ and $S_2$ designate the respective variable spaces between the movable lens members, $n_D$ represents the refractive indices and $\nu$ represents the respective Abbe numbers of said lenses, + curves by convention being convex toward entering image rays,

[Zoom Range=2]

| Lens | Curvatures | Thickness | Spacing at Unity Magnification | $n_D$ | $\nu$ | Focal Length |
|---|---|---|---|---|---|---|
| A | $+63.98=R_1$ | $t_1=3.9$ | | 1.498 | 67.0 | +190.0 |
| B | $-98.175=R_2$ | $t_2=2.0$ | | 1.751 | 27.8 | |
| | Plano$=R_3$ | | $S_1=10.3$ | | | |
| | $-40.551=R_4$ | | | | | |
| C | $+8.472=R_5$ | $t_3=1.8$ | | 1.573 | 57.4 | -23.50 |
| D | $+15.75 = R_6$ | $t_4=3.2$ | | 1.720 | 29.3 | |
| | $+67.92 = R_7$ | | $S_2=26.8$ | | | |
| E | $-17.80 = R_8$ | $t_5=6.9$ | | 1.573 | 57.4 | +49.38 |
| F | $-35.00 = R_9$ | $t_6=1.2$ | | 1.720 | 29.3 | |

(References on following page)

References Cited in the file of this patent

UNITED STATES PATENTS

| | | |
|---|---|---|
| 2,165,341 | Capstaff et al. | July 11, 1939 |
| 2,209,532 | Michel | July 30, 1940 |
| 2,873,646 | Angenieux | Feb. 17, 1959 |
| 2,913,957 | Back | Nov. 24, 1959 |

FOREIGN PATENTS

| | | |
|---|---|---|
| 440,397 | Great Britain | Sept. 26, 1934 |